(12) United States Patent
Lin et al.

(10) Patent No.: US 6,961,250 B2
(45) Date of Patent: Nov. 1, 2005

(54) NON-ISOLATED AC POWER SUPPLY DEVICE AND METHOD FOR CONTROLLING THE SAME

(75) Inventors: Yi-Min Lin, Taipei (TW); Sheng-Hung Lin, Yunlin Hsien (TW)

(73) Assignee: Phoenixtec Power Co., Ltd., Taipei (TW)

( * ) Notice: Subject to any disclaimer, the term of this patent is extended or adjusted under 35 U.S.C. 154(b) by 116 days.

(21) Appl. No.: 10/640,737

(22) Filed: Aug. 13, 2003

(65) Prior Publication Data

US 2005/0036345 A1    Feb. 17, 2005

(51) Int. Cl.[7] ............................................ H02M 3/335
(52) U.S. Cl. .......................... 363/16; 363/41; 363/131
(58) Field of Search ........................... 363/16, 17, 20, 363/65, 127, 131, 132, 41; 323/224, 225, 323/271, 222; 307/66, 45, 75, 87, 48; 320/140, 320/48

(56) References Cited

U.S. PATENT DOCUMENTS 5,126,585 A  *  6/1992  Boys ............................ 307/66
5,196,995 A  *  3/1993  Gulczynski ................... 363/16

* cited by examiner

Primary Examiner—Rajnikant B. Patel
(74) Attorney, Agent, or Firm—Dellett & Walters

(57) ABSTRACT

A non-isolated power supply device and a method for controlling the same, wherein only one DC voltage bus is adopted and the neutral lines of the input voltage and output voltage are directly connected together. During the periods that the voltage polarities of the input voltage and output voltage are not the same, the power supply device is operated in a flyback mode to avoid the generation of an abnormal current. Otherwise, during the periods that the voltage polarities of the input voltage and output voltage are the same, the power supply device is operated in a boost mode to derive a superior efficiency.

20 Claims, 16 Drawing Sheets

NON-ISOLATED AC POWER SUPPLY DEVICE AND METHOD FOR CONTROLLING THE SAME

BACKGROUND OF THE INVENTION

1. Field of Invention

The present invention relates to a non-isolated power supply device and a method for controlling the same, more particularly to a non-isolated power supply device that can be operated in a flyback mode thereby solving the problem that the input AC power is not inphase to the output AC power while the frequency of the input AC power is varied rapidly.

2. Related Art

Conventional UPS systems can be substantially categorized into two types, the isolated type and the non-isolated type, based on whether an isolated transformer is applied in the UPS systems.

When the input AC power is converted by an inverter and then supplied to a load, the neutral line of the inverter is required to have the same properties as the neutral line of the input AC power thereby preventing the load of the UPS system from receiving any electric surge and grounding noise. In other words, the voltage potential of the neutral line of the inverter in relative to the ground is required to be lower then a pre-determined value. To satisfy such a requirement, a general way is to connect the neutral line of the inverter and the neutral line of the input AC power together. In the conventional single DC voltage bus configuration, the output of the inverter is coupled to the load through an isolated transformer, otherwise the neutral line of the bypass and the neutral line of the inverter can not be connected together. Moreover, the above mentioned bulky and expensive inverter may reduce the power conversion efficiency of the UPS system. Therefore, the non-isolated dual DC voltage bus (double conversion) UPS is developed to replace the single DC voltage bus UPS.

With reference to the non-isolated UPS systems as shown in FIGS. 11 to 13, since the neutral line of the input power is connected to the output stage as the neutral line of the inverter, the dual DC voltage bus configuration is adopted and a half bridge is provided as the output stage. When the output stage couples with an unbalanced load or a reactance load, the voltage across the two DC voltage capacitors will become unbalanced, and thus a lot of additional capacitors are usually applied to solve such a problem. Otherwise, the voltage on any one of the two DC voltage capacitors may become too high or low, which leads the entire system to enter a fault protection mode.

To overcome the above shortcomings of the dual DC voltage bus configuration, the single DC voltage bus UPS system accompanied with a full bridge inverter as the output stage is developed, wherein the single DC voltage bus can supply power to the load whether in the positive or negative half cycles. Such a single DC voltage bus configuration not only solves the problems of the dual DC voltage bus configuration, but also approximately reduce a half of loss of the core in comparison with the dual DC voltage bus configuration. Moreover, semiconductor switching elements and capacitors with high voltage tolerance ability are suitable to be applied in the single DC voltage bus. Further, the amount of the capacitors in the single DC voltage bus is less than that of the dual DC voltage bus.

With reference to FIG. 14, a conventional non-isolated single DC voltage bus UPS is shown. It should be noted that the phases of the output voltage and the input voltage of the inverter must be maintained as the same as each other. Otherwise, an abnormal current will be induced because there is no isolated transformer in the UPS system. For example, if the output voltage of the inverter is in a positive cycle, a switch Q1 must be activated to make the inverter output a positive voltage. Once the output voltage of the inverter is not a positive cycle but a negative cycle, an abnormal current as shown in broken line is occurred.

When the quality of input voltage is inferior or the frequency is rapidly varied, especially for a power generator, the problem of the abnormal current is more serious. Since the voltage frequency of the power generator varies quickly, the voltage from the power generator should be purged by the UPS system thereby providing a stable power to the load. However, the conventional single DC voltage bus is unable to satisfy such a requirement.

In the condition that the utility voltage from the electricity company experiences a long interruption, the UPS system must utilize its battery to provide the emergency power to the load. One common way to prolong the time of the emergency power supply is by increasing the amount of the batteries. However, since the battery is expensive and bulky, the UPS system is required to receive the power from the power generator and then converts the power from the generator to a pure power for supply to the load. Thus, a UPS with the non-isolated single DC voltage bus configuration being able to solve these problems is necessary.

SUMMARY OF THE INVENTION

The main objective of the present invention is to provide a non-isolated power supply device and a method for controlling the same, wherein when the frequency of the input AC voltage is varied rapidly, the power supply device is able to be operated normally and solves the problems caused from the unsynchronized phases of the input and output voltages.

To achieve the objective of the present invention, the method for controlling a non-isolated power supply device with an inductor and a bus capacitor is achieved by:

performing a flyback mode on the non-isolated power supply device when the input voltage and the output voltage of said power supply device are not synchronized with each other, wherein said inductor in said power supply device stores energy from the input voltage and then supplies the stored energy to said bus capacitor to prevent an abnormal current loop between the input voltage and output voltage.

Further, when the input voltage and the output voltage are synchronized with each other, a boost mode is performed on the said power supply device, wherein said inductor only stores the energy for boosting voltage and then releases the stored energy to the bus capacitor.

By properly choosing the operation modes performed on the power supply device, the power supply device is able to be operated normally even when the input AC voltage is unstable. Furthermore, because most UPS systems will phase lock the input AC voltage, the input and the output voltage are synchronized with each other most of the time so that the power supply device is operated in the boost mode to obtain a high efficiency.

Other objectives, advantages and novel features of the invention will become more apparent from the following detailed description when taken in conjunction with the accompanying drawings.

DETAILED DESCRIPTION OF THE INVENTION

Figure 1:
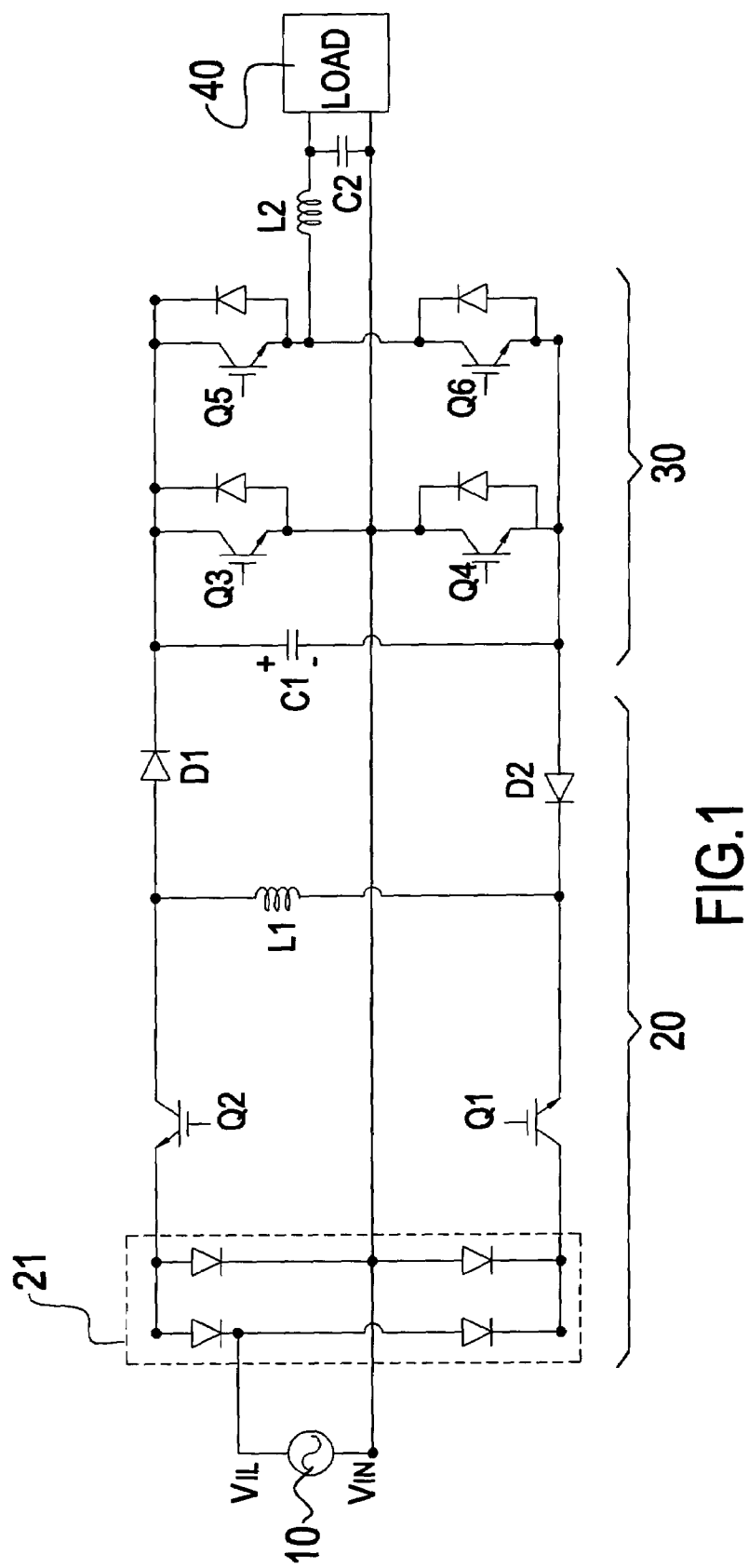
FIG. 1 is a circuit diagram of a first embodiment of a power supply device of the invention.

With reference to FIG. 1, a first embodiment of a single DC voltage bus power supply device is shown. It should be noted that the purpose of the embodiment is only for explaining the present invention and does not intend to limit the scope of the present invention. The device mainly comprises an input AC voltage source (10), a AC/DC converting unit (20), a DC/AC converting unit (30), and a load.

The AC/DC converting unit (20) is coupled with the input AC voltage source (10).

The DC/AC converting unit (30) is coupled to the output of the AC/DC converting unit (20), wherein the DC/AC converting unit (30) is a full bridge inverter composed of four switching transistors (Q3–Q6) to convert the DC power to AC power and then supply the AC power to a load (40). The output of full bridge inverter further couples with an output inductor (L2) and an output capacitor (C2) to which a neutral line of the input AC voltage source (10) is coupled. Therefore the neutral line serves as a neutral line of the output stage of the power supply device. In other words, the input voltage and the output AC voltage are coupled at a common reference node, i.e., the neutral line.

The AC/DC converting unit (20) comprises a full bridge rectifier (21) with two output terminals coupled to two switches (Q1, Q2), respectively. An inductor (L1) is coupled between the two switches (Q1, Q2), wherein the two terminals of the inductor (L1) are coupled to an anode and a cathode of two diodes (D1, D2) respectively. A bus capacitor (C1) is coupled between the two diodes (D1, D2) thereby forming a single DC voltage bus configuration.

Based on the conditions of the input AC voltage source (10), the operations of the above embodiment are categorized into several modes.

A. Flyback Mode

When the frequency of the input AC voltage source (10) is varied rapidly, for example the input AC voltage source (10) is from a low quality power generator, the flyback mode allows the power device to receive any input power having quick varied frequency to avoid the abnormal current caused from the phase difference between the input and output voltages.

Figure 2:
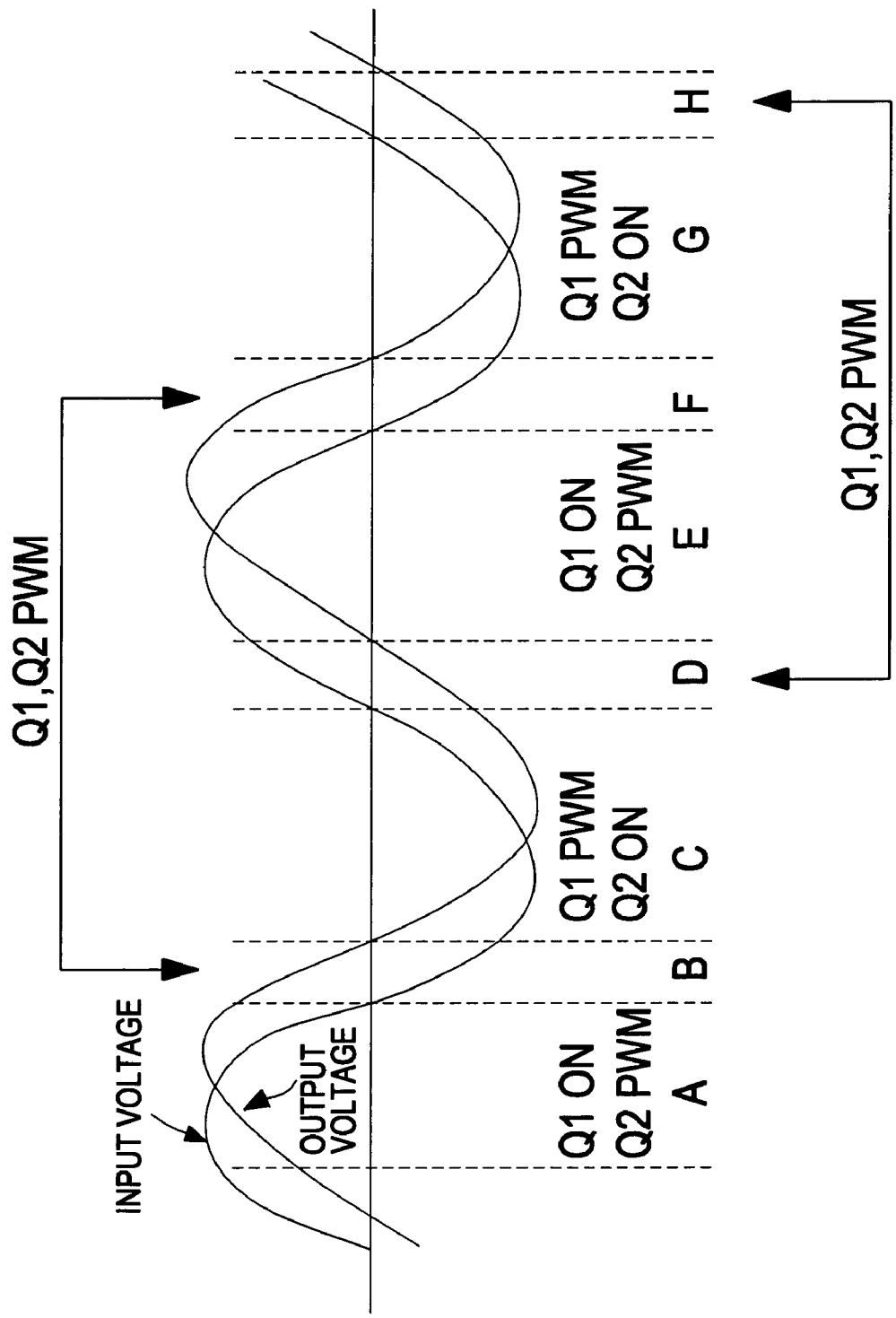
FIG. 2 is a timing chart presenting the input voltage and the unsynchronized output voltage of the invention.
Figure 3:
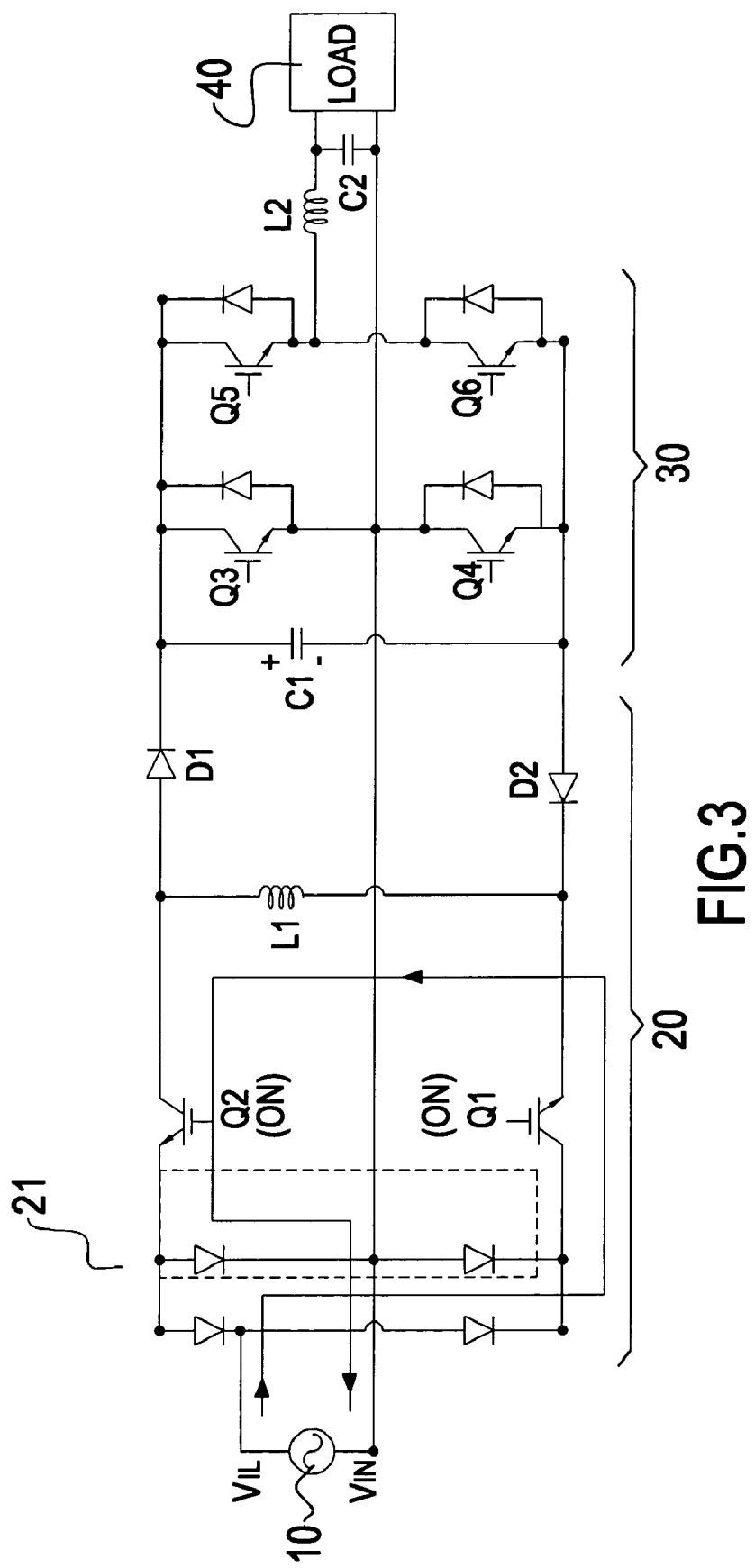
FIG. 3 illustrates two switches Q1 and Q2 are both activated in accordance with the present invention, wherein the input AC voltage is positive.
Figure 5:
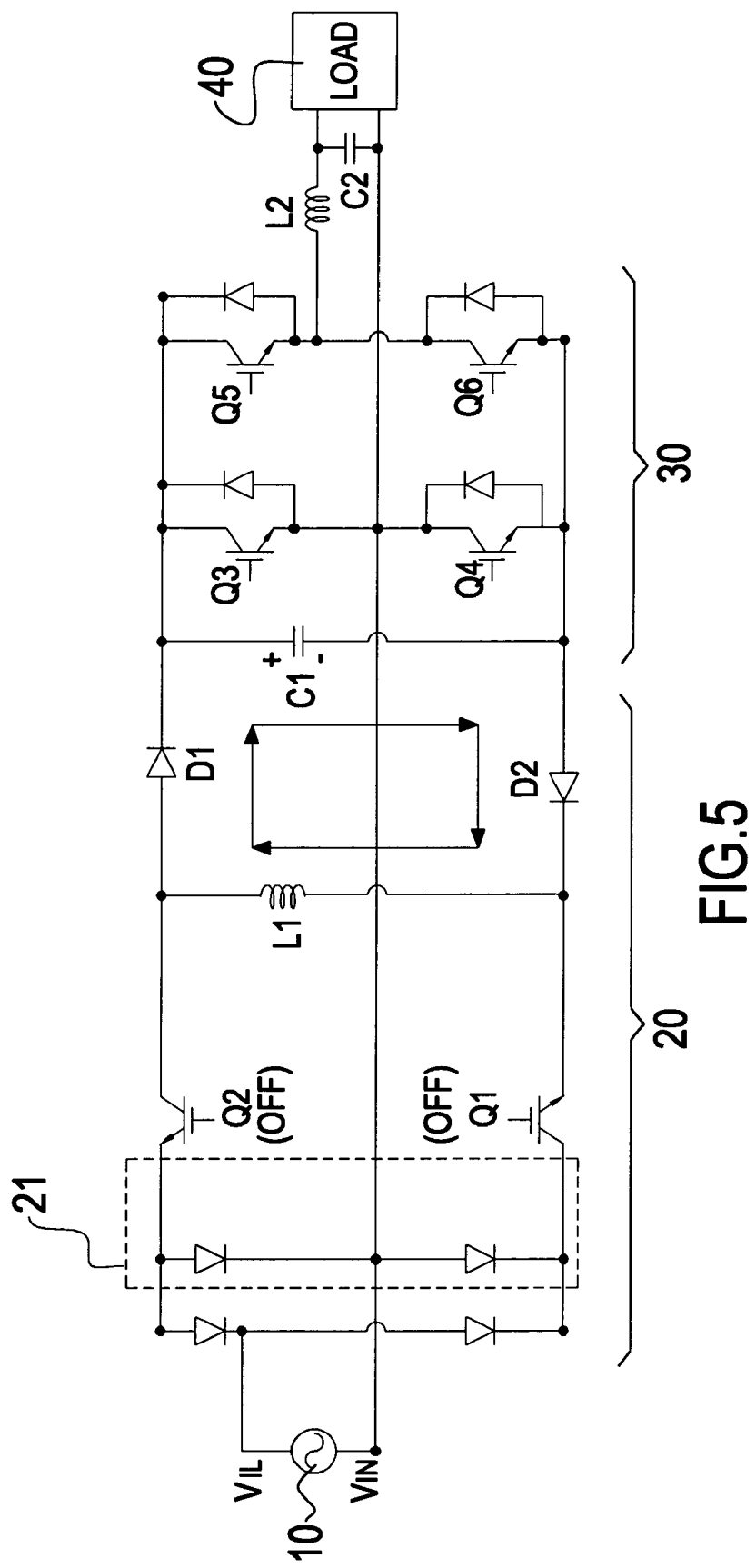
FIG. 5 illustrates two switches Q1 and Q2 are both deactivated in accordance with the present invention.

As shown in periods D and H of FIG. 2, when the input voltage is positive and the output voltage is negative, the two switches (Q1, Q2) are synchronously controlled by PWM signals. When the two switches (Q1, Q2) are both activated, the circuit operation as shown in FIG. 3 begins, and a current flows through and charges the inductor (L1). When the two switches (Q1, Q2) are both deactivated, the circuit operation as shown in FIG. 5 begins, and the energy stored in the inductor (L1) is released to the bus capacitor (C1) and then power is supplied to the load from the bus capacitor (C1).

Figure 4:
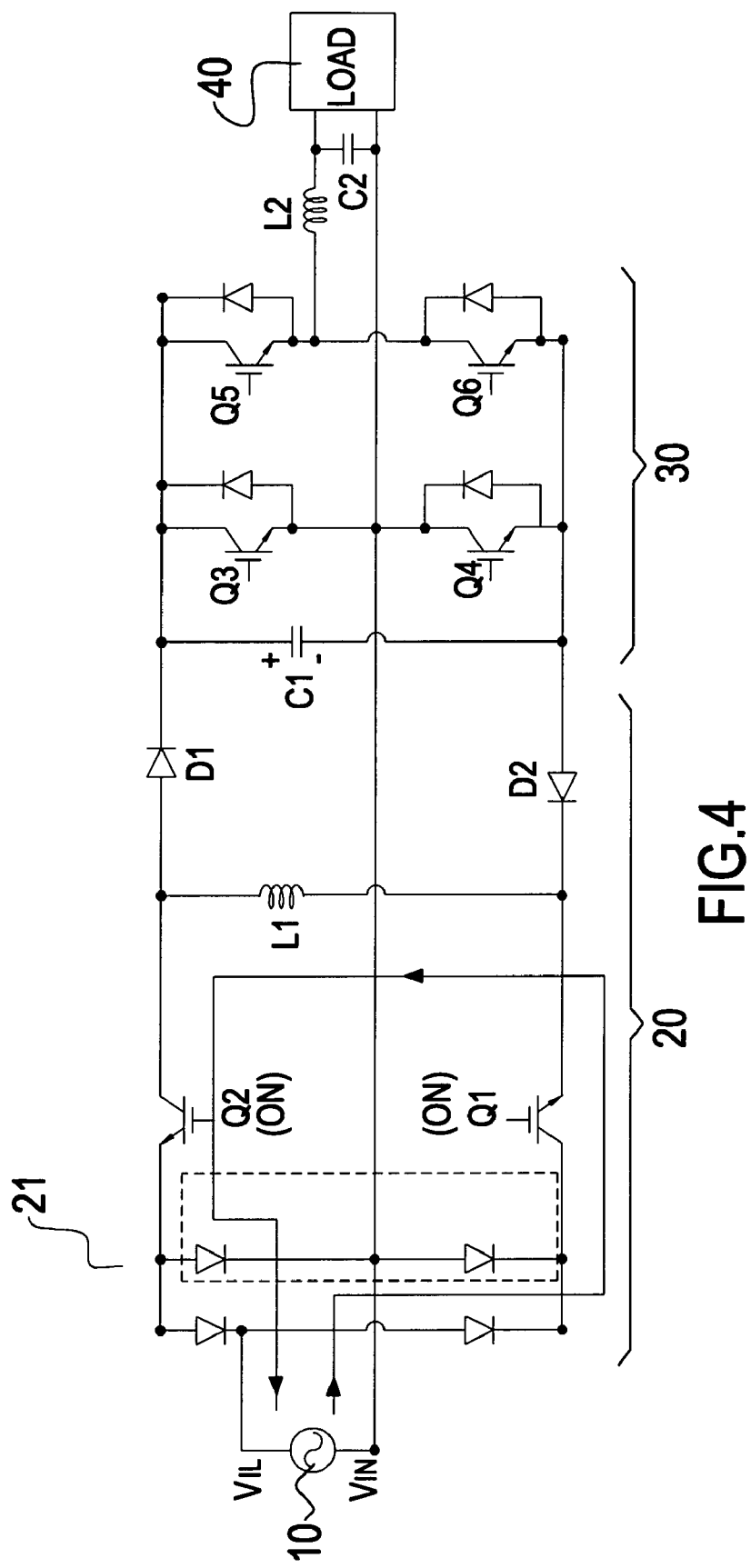
FIG. 4 illustrates two switches Q1 and Q2 are both activated in accordance with the present invention, wherein the input AC voltage is negative.

With reference to FIG. 2 and periods B and F, when the input voltage is negative and the output voltage is positive, the two switches (Q1, Q2) are still also synchronously controlled by PWM signals. When the two switches (Q1, Q2) are both activated, the circuit operation as shown in FIG. 4 begins, and a current flows through and charges the inductor (L1). When the two switches (Q1, Q2) are both deactivated, the circuit operation as shown in FIG. 5 begins, and the energy stored in the inductor (L1) is released to the bus capacitor (C1) and then power is supplied to the load from the bus capacitor (C1).

B. Boost Mode

When the input AC voltage source (10) and the output voltage of the power supply device have the same polarity, the power supply device is operated in the boost mode to improve the power conversion efficiency.

Figure 6:
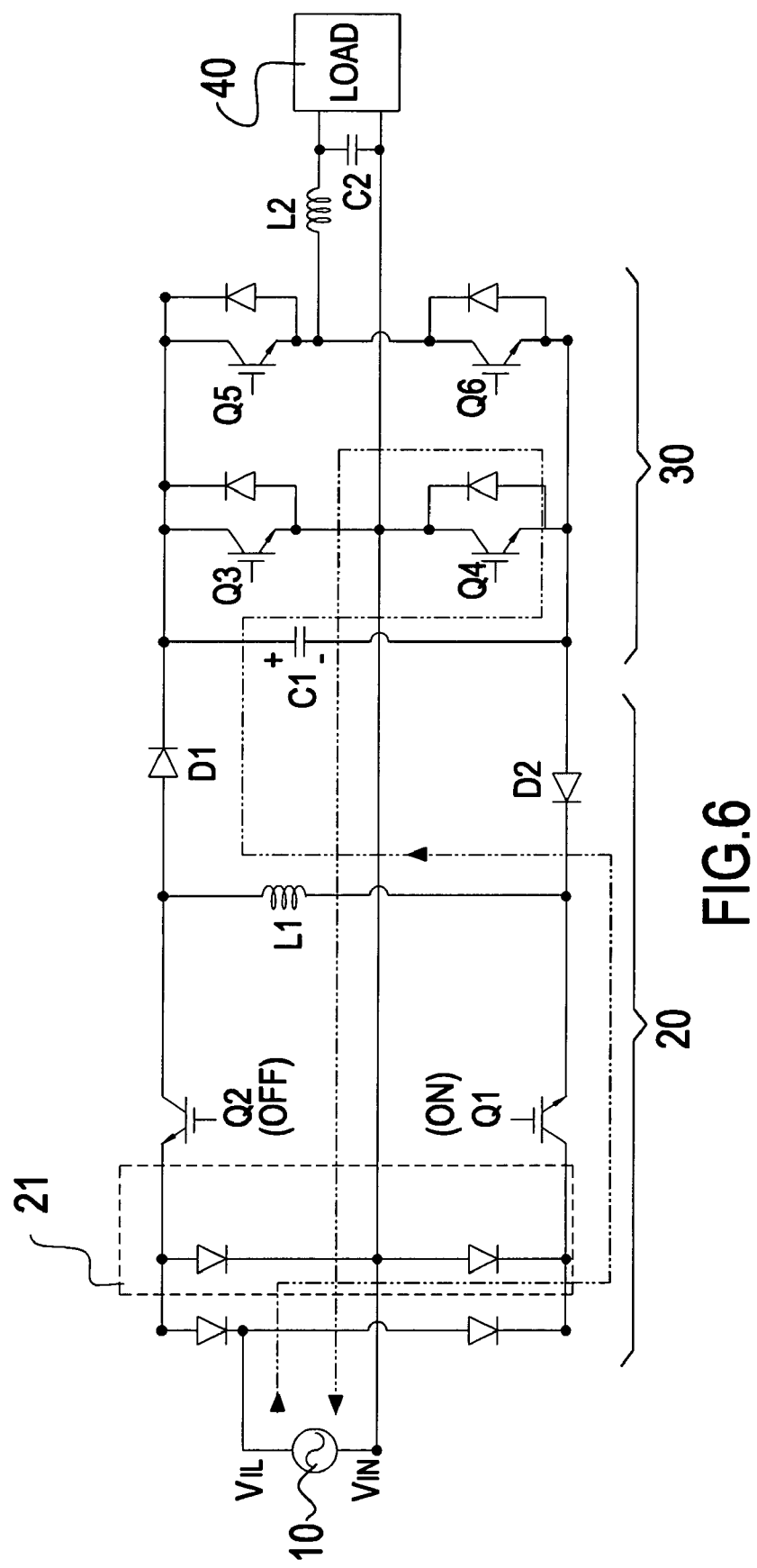
FIG. 6 illustrates the first switch Q1 is activated and the second switch Q2 is deactivated in accordance with the present invention.

With reference to FIG. 2 and periods A and E, when the input voltage and the output voltage are positive, the first switch (Q1) is kept in the activated status and the second switch (Q2) is controlled by PWM signals. When the second switch (Q2) is activated, the current flow path is as shown in FIG. 3. Otherwise, when the second switch (Q2) is deactivated, the flow path is as shown in FIG. 6. Meanwhile, the switching transistor (Q3) should be deactivated to avoid the generation of the abnormal current.

Figure 7:
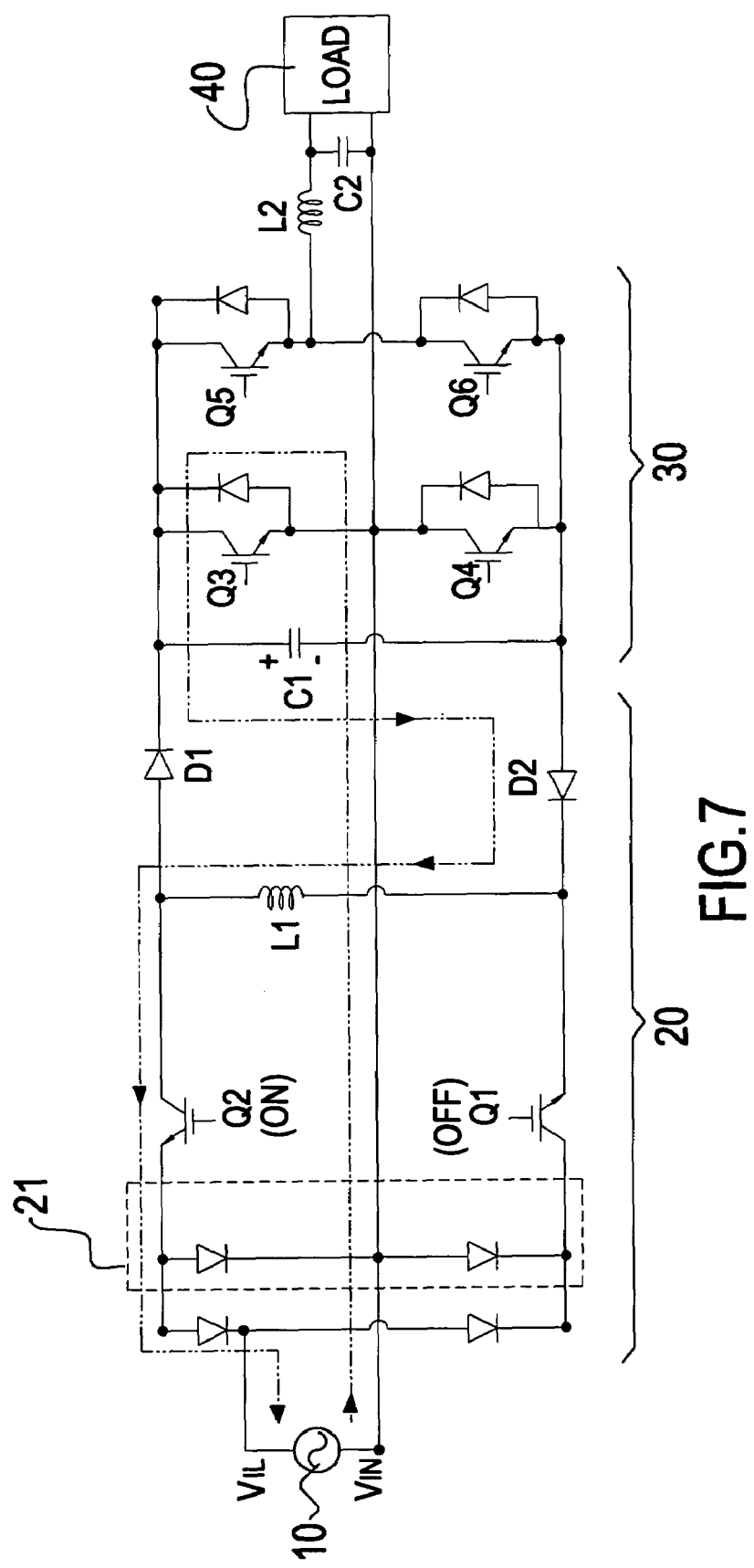
FIG. 7 illustrates the first switch Q1 is deactivated and the second switch Q2 is activated in accordance with the present invention.

When the input voltage and the output voltage are negative as shown in periods C and G in FIG. 2, the power supply device is still operated in the boost mode. The second switch (Q2) is kept in the activated status and the first switch (Q1) is controlled by PWM signals. When the first switch (Q1) is activated, the current flow path is as shown in FIG. 4. Otherwise, when the first switch (Q1) is deactivated, the flow path is as shown in FIG. 7. Meanwhile, the switching transistor (Q4) must be deactivated to avoid the generation of the abnormal current.

Whether the input voltage and the output voltage are positive or negative, the inductor (L1) firstly stores energy therein for voltage boosting, and then releases the stored energy to the bus capacitor (C1) to boost the voltage level on the bus capacitor (C1).

Figure 8:
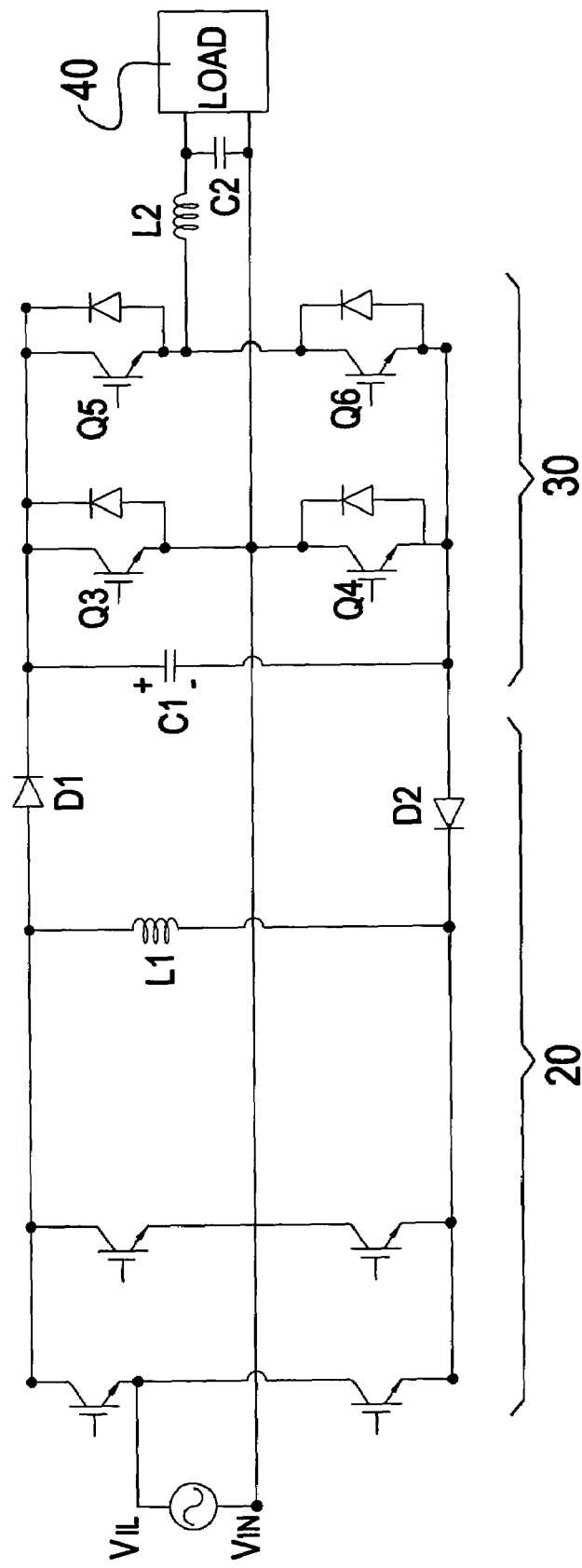
FIG. 8 is a circuit diagram of a second embodiment of a power supply device of the invention.
Figure 9:
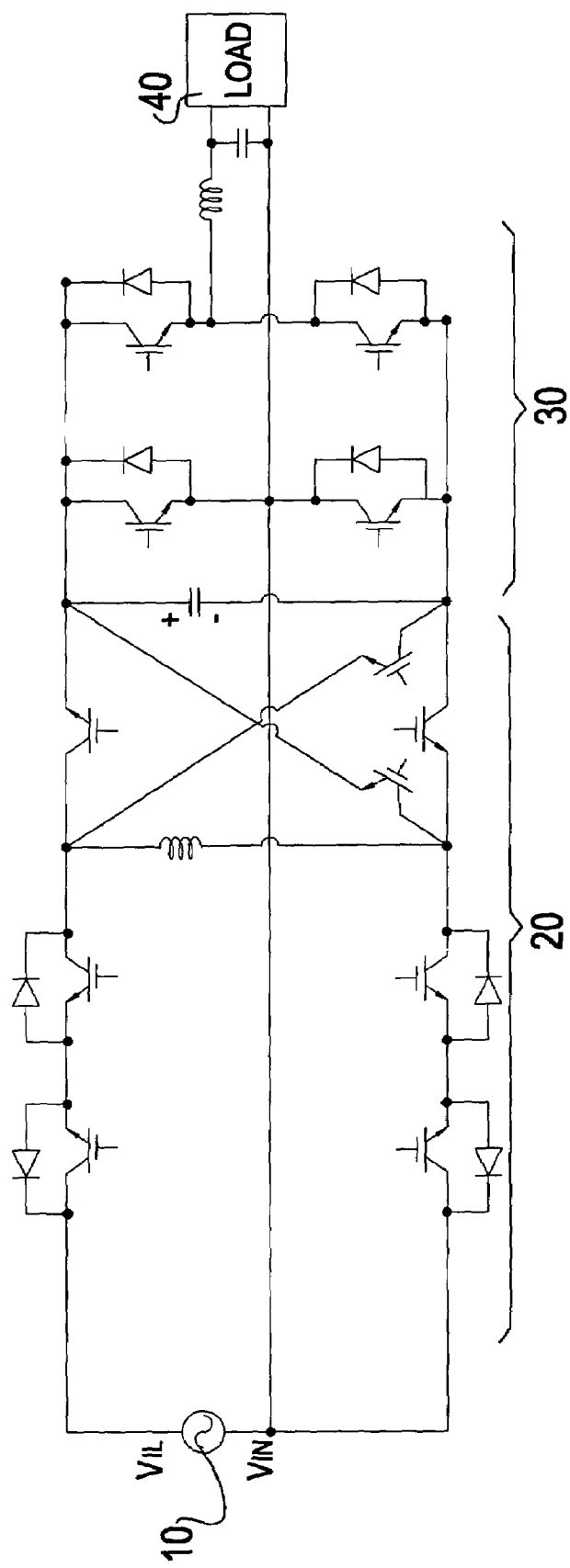
FIG. 9 is a circuit diagram of a third embodiment of a power supply device of the invention.

With reference to FIGS. 8 and 9, a second and a third embodiment in accordance with the present invention are shown. Both the embodiments are designed based on the flyback mode operation to overcome the problems caused from the phase difference between the output and input voltages.

Figure 10A:
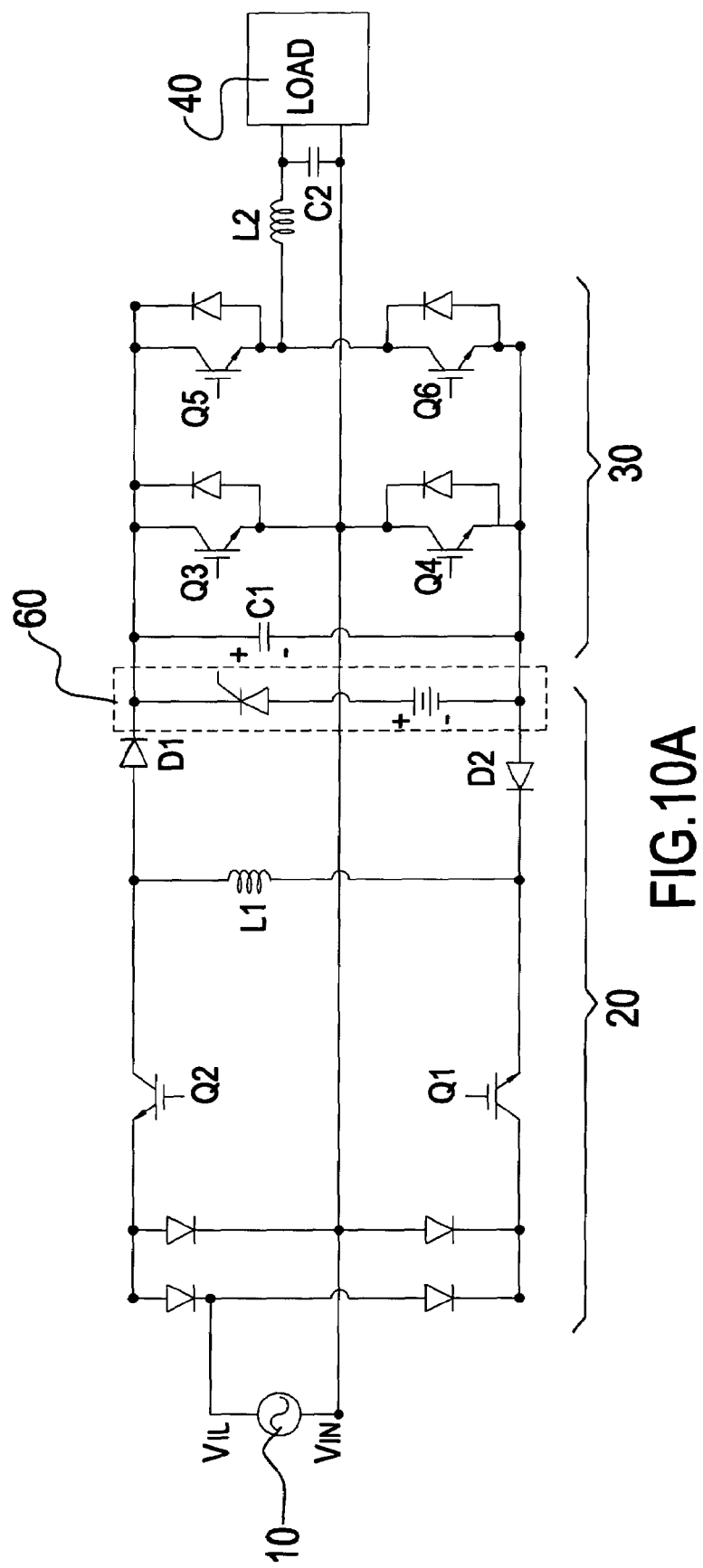
FIGS. 10A to 10C show a battery backup circuit is combined in power supply devices in accordance with the present invention.
Figure 10B:
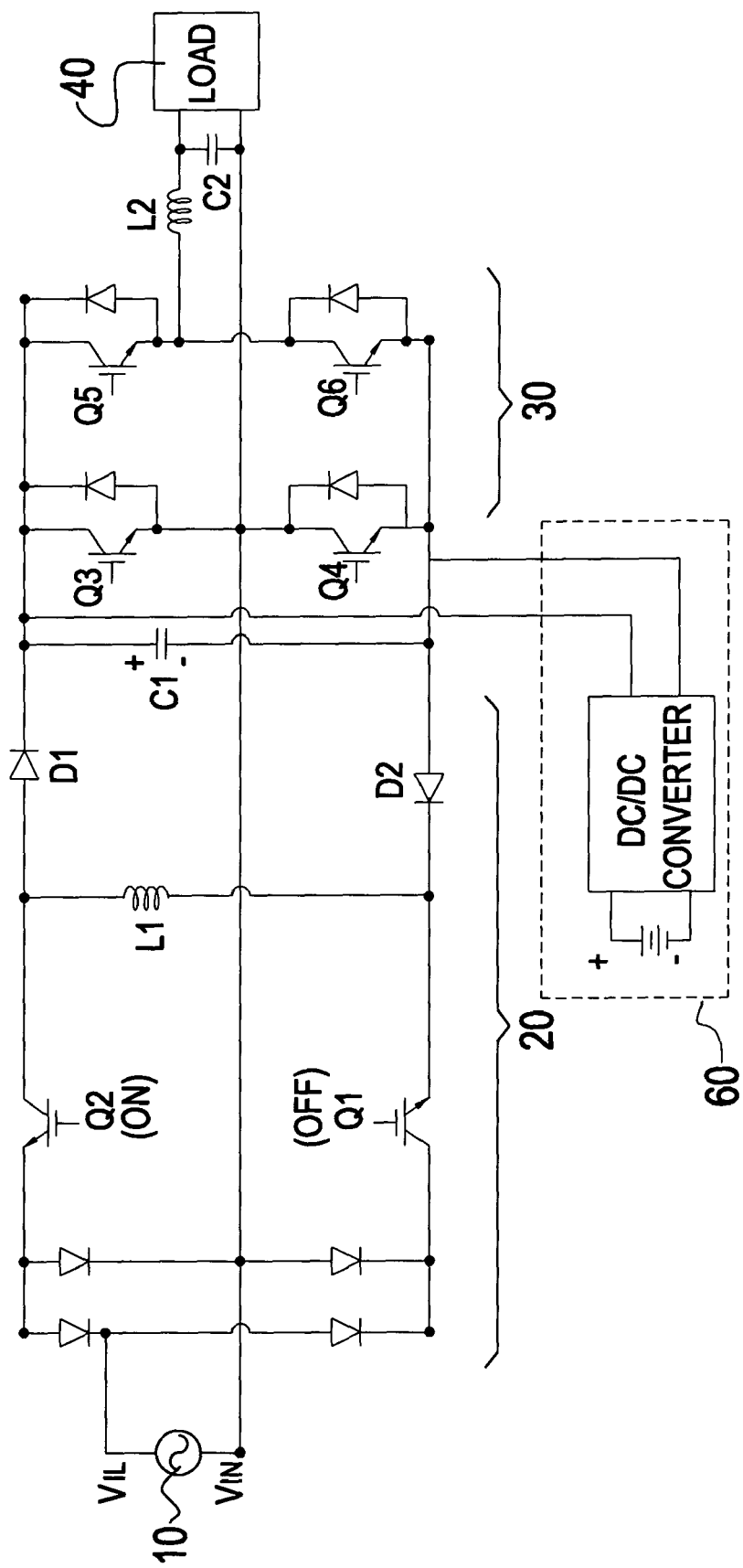
Figure 10C:
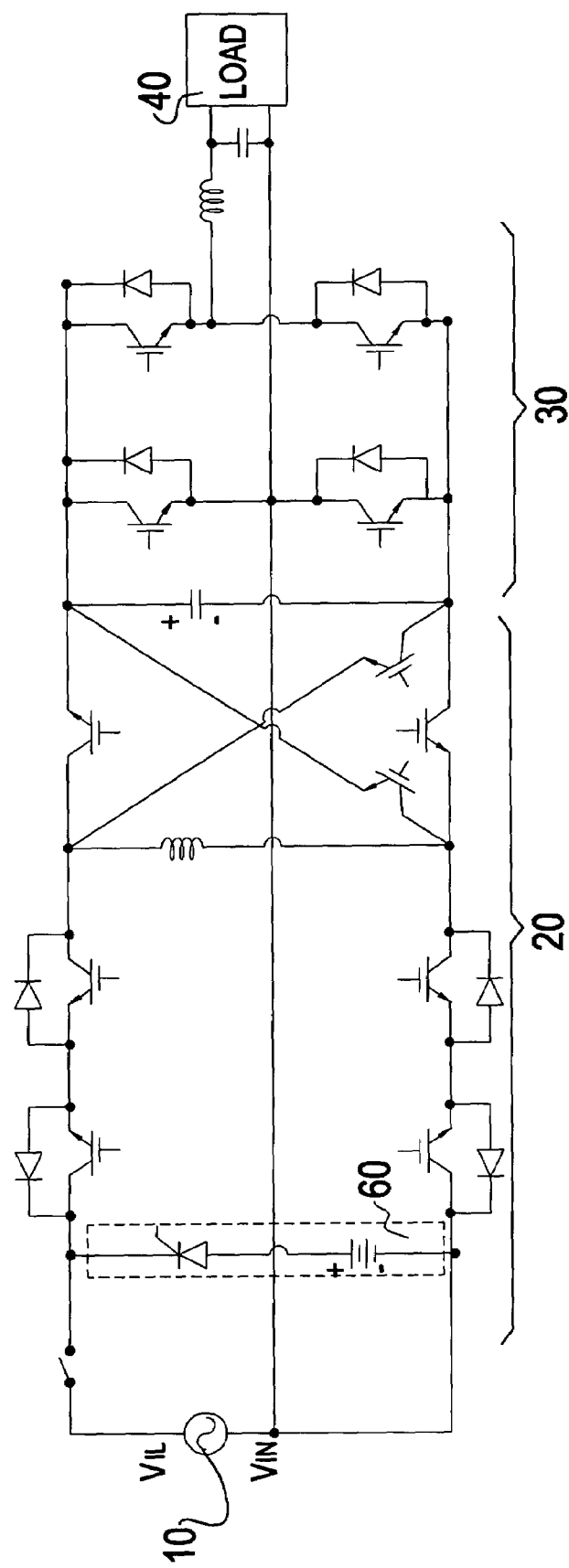
Figure 11:
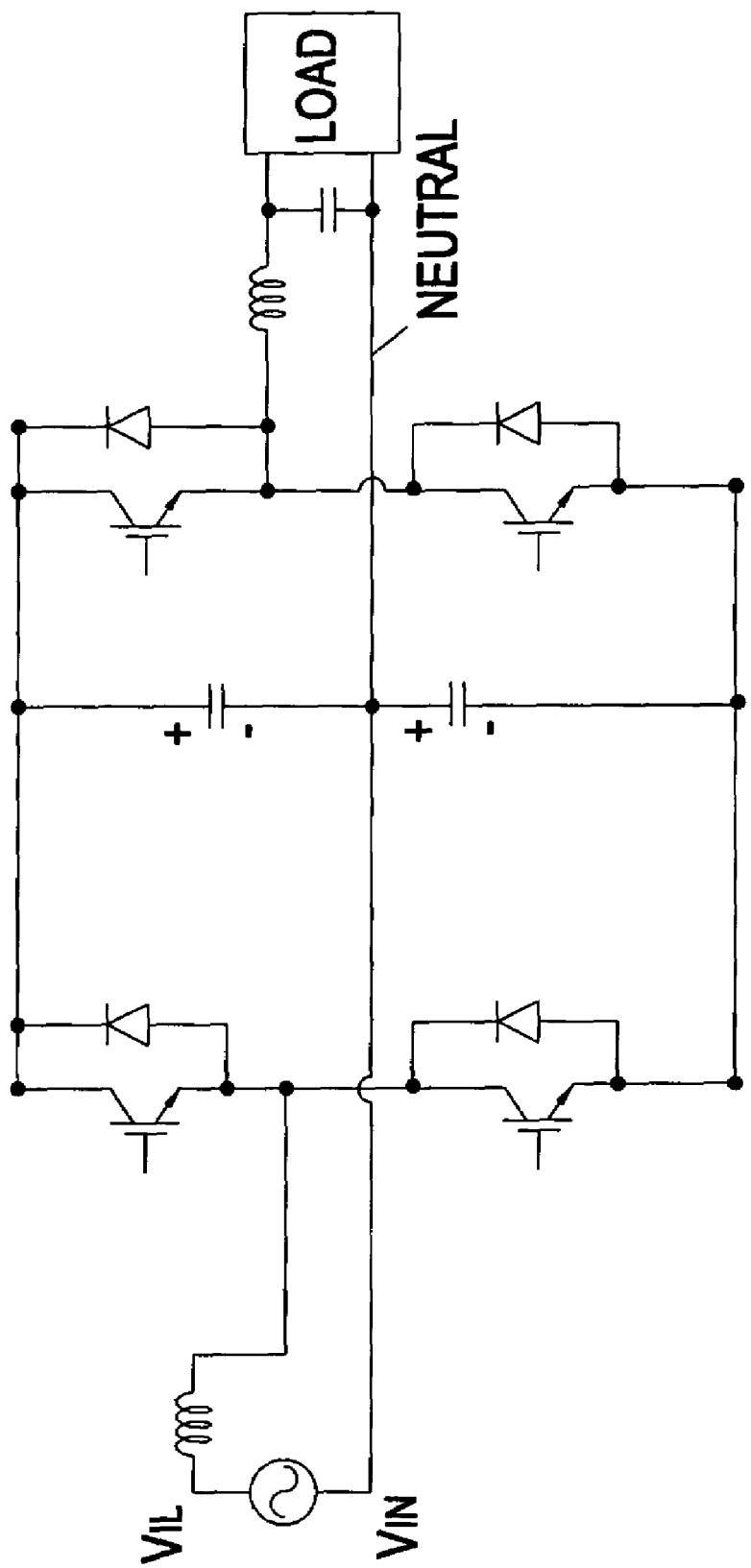
FIGS. 11 to 13 are circuit diagrams of different types of the conventional non-isolated dual DC voltage bus configuration.
Figure 12:
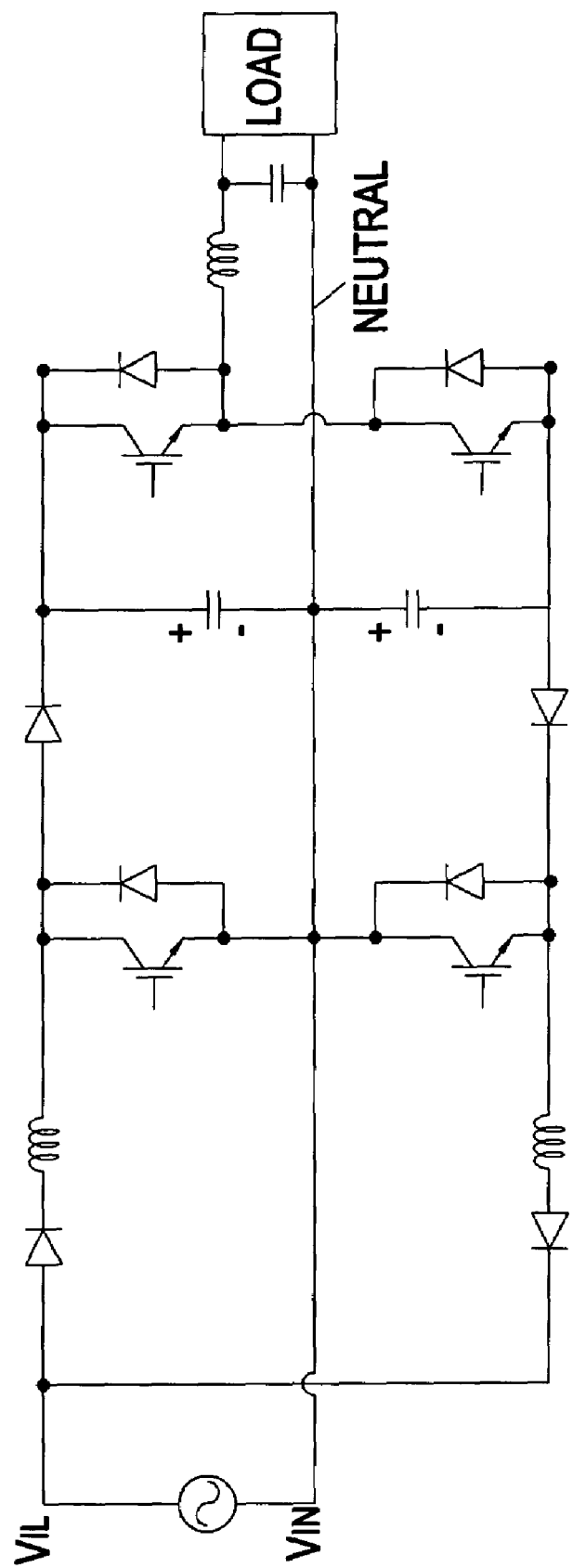
Figure 13:
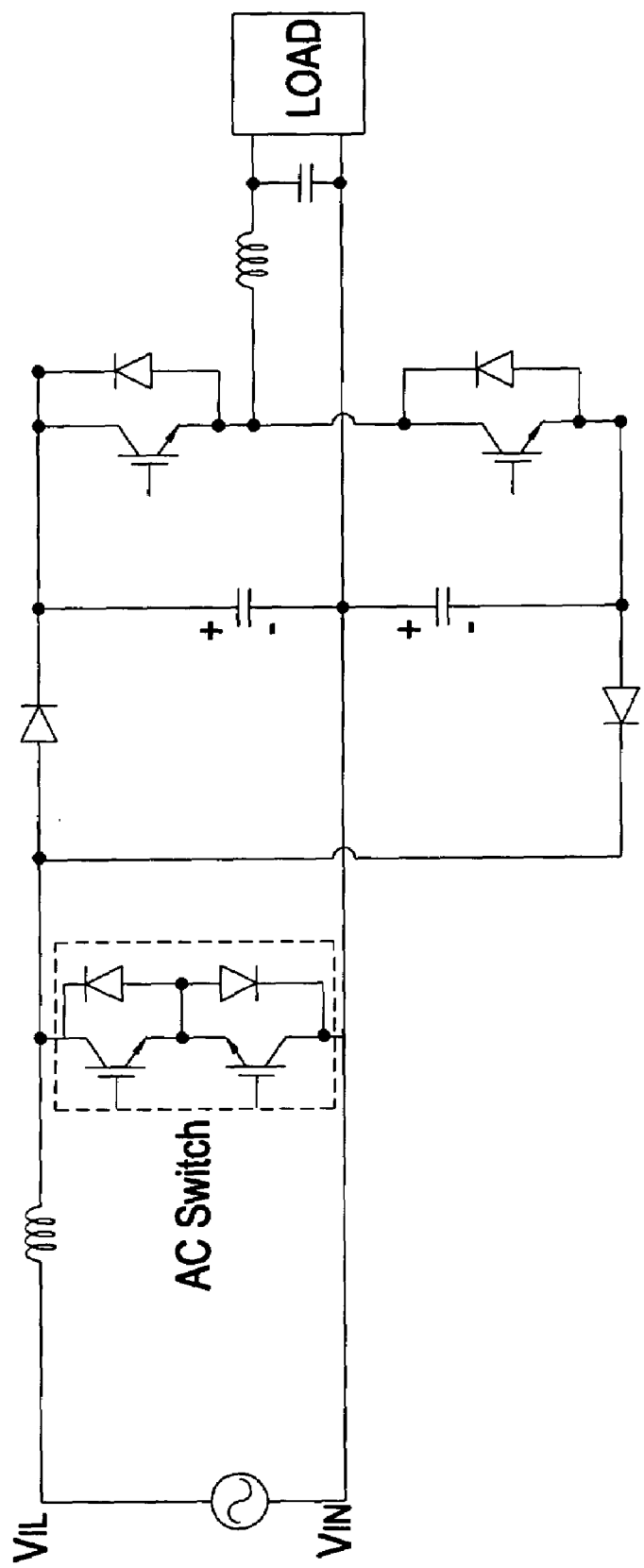
Figure 14:
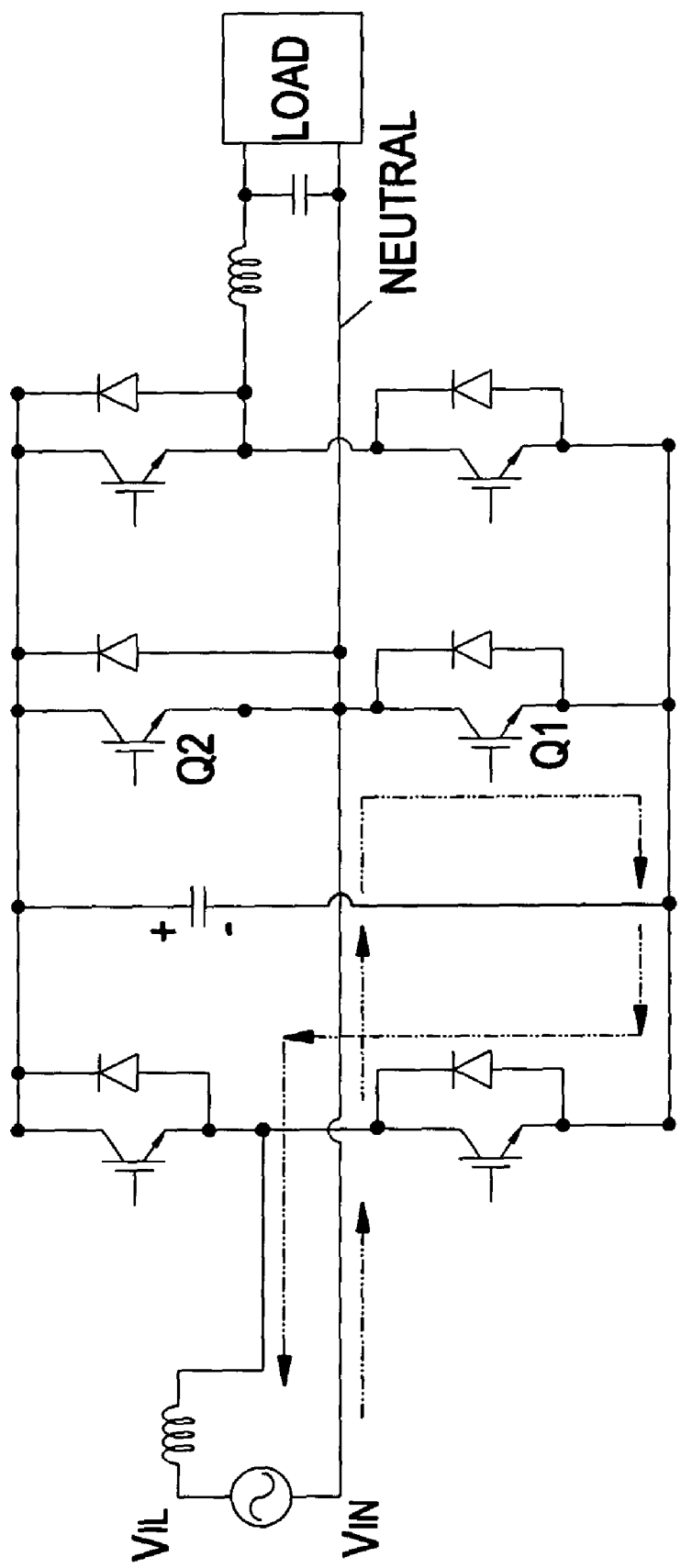
FIG. 14 is a circuit diagram of a conventional non-isolated single DC voltage bus configuration.

All the embodiments mentioned foregoing are able to receive the input AC voltage and then supply a clean and stable AC voltage to the load. Therefore, each power supply device can be deemed as a voltage regulator. If a battery backup circuit (60) (as shown in FIGS. 10A to 10C) is combined in the foregoing embodiments, each circuit constructs a complete UPS. The battery backup circuit (60) is able to store energy by a battery charger (not shown) included in the backup circuit (60) while the input AC voltage is normally supplied, and also able to supply the stored energy to the load once the input AC voltage has any failure.

From the foregoing description, for the input AC voltage with inferior electricity quality, such as the frequency of the input AC voltage is varied quickly, the present invention provides a flyback mode operation to solve problems resulted from the unsynchronized phases of the input and output voltage. Furthermore, for the superior input AC voltage, the present invention can utilize the boost mode to improve the efficiency.

The invention may be varied in many ways by a skilled person in the art. Such variations are not to be regarded as a departure from the spirit and scope of the invention, and all such modifications are intended to be included within the scope of the following claims.

What is claimed is:

1. A method for controlling a power supply device that receives an input AC voltage and supplies an output AC voltage to a load where the input AC voltage and the output AC voltage are commonly coupled to a common reference node, wherein the method comprises the steps of:

performing a flyback mode on the power supply device during periods in which the input AC voltage and the output AC voltage is in opposite polarity to each other, wherein an inductor in said power supply device stores energy from the input AC voltage and then supplies the stored energy to a single DC bus capacitor without a direct connection to the common reference node to prevent an abnormal current loop between the input AC voltage and the output AC voltage.

2. The method as claimed in claim 1, wherein the method further comprises:

performing a boost mode on the power supply device during periods in which the polarities of the input AC voltage and the output AC voltage of said power supply device are the same as each other, wherein said inductor firstly stores the energy for boosting voltage of the single DC bus capacitor and then releases the stored energy to the single DC bus capacitor.

3. A non-isolated power supply device having as common reference node to which an input AC voltage and an output AC voltage are commonly coupled, the power supply device comprising:

an AC/DC converting unit coupled to the input AC voltage for supplying a DC power to a single DC voltage bus;

a DC/AC converting unit coupled to the single DC voltage bus for converting the DC power to the output AC voltage and then supplying the AC voltage to a load, wherein the single DC voltage bus can supply power to the load whether in the positive or negative cycles;

wherein when the polarity of the input AC voltage is different to that of the output AC voltage from the DC/AC converting unit, the non-isolated power supply device is operated in a flyback mode, and an inductor of the AC/DC converting unit stores the energy from the input AC voltage and then provides the stored energy to a DC bus capacitor without a direct connection to the common reference node, the DC bus capacitor then supplying the stored energy to the load.

4. The non-isolated power supply device as claimed in claim 3, wherein the AC/DC converting unit comprises:

a full bridge rectifier with two output terminals respectively coupled to two switches, an inductor coupled between the two switches, wherein two ends of the inductor are coupled to an anode and a cathode of two diodes respectively, and the DC bus capacitor is coupled between the two diodes.

5. The non-isolated power supply device as claimed in claim 3, the DC/AC converting unit coupling to an output inductor and an output capacitor, a neutral line of the input AC voltage being coupled to the capacitor and acting as a neutral line of the non-isolated power supply device, wherein the output capacitor is coupled to the load.

6. The non-isolated power supply device as claimed in claim 4, the DC/AC converting unit coupling to an output inductor and an output capacitor, a neutral line of the input AC voltage being coupled to the capacitor and acting as a neutral line of the non-isolated power supply device, wherein the output capacitor is coupled to the load.

7. The non-isolated power supply device as claimed in claim 3, the DC/AC converting unit is a full bridge inverter.

8. The non-isolated power supply device as claimed in claim 4, the DC/AC converting unit is a full bridge inverter.

9. The non-isolated power supply device as claimed in claim 5, the DC/AC converting unit is a full bridge inverter.

10. The non-isolated power supply device as claimed in claim 6, the DC/AC converting unit is a full bridge inverter.

11. The non-isolated power supply device as claimed in claim 3, wherein when the polarity of the input AC voltage is the same as that of the output AC voltage output from the DC/AC converting unit, the AC/DC converting unit is operated in a boost mode, wherein the inductor firstly stores the energy for boosting voltage of the DC bus capacitor and then releases the stored energy to the DC bus capacitor.

12. A non-isolated UPS having a common reference node to which an input AC voltage and an output AC voltage are commonly coupled, the UPS comprising:

an AC/DC converting unit coupled to the input AC voltage for supplying a DC power to a single DC voltage bus;

a DC/AC converting unit coupled to the single DC voltage bus for converting the DC power to the output AC voltage and then supplying the output AC voltage to a load, wherein the single DC voltage bus can supply power to the load whether in the positive or negative cycles;

a battery backup circuit, wherein the battery backup circuit stores energy while the input AC voltage is normally supplied, and when the input AC voltage is interrupted, the battery backup circuit supplies the stored energy to the load;

wherein when the polarity of the input AC voltage is different to that of the AC voltage output from the DC/AC converting unit, the non-isolated power supply device is operated in a flyback mode, and an inductor of the AC/DC converting unit stores the energy from the input AC voltage and then provides the stored energy to a DC bus capacitor without a direct connection to the common reference node, the DC bus capacitor then supplying the stored energy to the load.

13. The non-isolated UPS as claimed in claim 12, wherein the AC/DC converting unit comprises:
   a full bridge rectifier with two output terminals respectively coupled to two switches, an inductor coupled between the two switches, wherein two ends of the inductor are coupled to an anode and a cathode of two diodes respectively, and the DC bus capacitor is coupled between the two diodes.

14. The non-isolated UPS as claimed in claim 12, the DC/AC converting unit coupling to an output inductor and an output capacitor, a neutral line of the input AC voltage being coupled to the output capacitor and acting as a neutral line of the non-isolated power supply device, wherein the output capacitor is coupled to the load.

15. The non-isolated UPS as claimed in claim 13, the DC/AC converting unit coupling to an output inductor and an output capacitor, a neutral line of the input AC voltage being coupled to the output capacitor and acting as a neutral line of the non-isolated power supply device, wherein the output capacitor is coupled to the load.

16. The non-isolated UPS as claimed in claim 12, wherein the DC/AC converting unit is a full bridge inverter.

17. The non-isolated UPS as claimed in claim 13, wherein the DC/AC converting unit is a full bridge inverter.

18. The non-isolated UPS as claimed in claim 14, wherein the DC/AC converting unit is a full bridge inverter.

19. The non-isolated UPS as claimed in claim 15, wherein the DC/AC converting unit is a full bridge inverter.

20. The non-isolated UPS as claimed in claim 12, wherein when the polarity of the input AC voltage is the same as that of the output AC voltage from the DC/AC converting unit, the AC/DC converting unit is operated in a boost mode, wherein the inductor firstly stores the energy for boosting voltage of the DC bus capacitor and then releases the stored energy to the DC bus capacitor.

* * * * *